United States Patent
Fujikawa et al.

(10) Patent No.: US 10,988,568 B2
(45) Date of Patent: *Apr. 27, 2021

(54) CURABLE COMPOSITION AND CURED PRODUCT FROM SAME

(71) Applicant: DAICEL CORPORATION, Osaka (JP)

(72) Inventors: Takeshi Fujikawa, Himeji (JP); Sadayuki Fukui, Himeji (JP)

(73) Assignee: DAICEL CORPORATION, Osaka (JP)

(*) Notice: Subject to any disclaimer, the term of this patent is extended or adjusted under 35 U.S.C. 154(b) by 212 days.

This patent is subject to a terminal disclaimer.

(21) Appl. No.: 15/748,037

(22) PCT Filed: Aug. 3, 2016

(86) PCT No.: PCT/JP2016/072816
§ 371 (c)(1),
(2) Date: Jan. 26, 2018

(87) PCT Pub. No.: WO2017/026351
PCT Pub. Date: Feb. 16, 2017

(65) Prior Publication Data
US 2018/0215861 A1    Aug. 2, 2018

(30) Foreign Application Priority Data
Aug. 13, 2015 (JP) .............................. JP2015-159893

(51) Int. Cl.
*C08G 59/24* (2006.01)
*B29C 39/02* (2006.01)
(Continued)

(52) U.S. Cl.
CPC ............ *C08G 59/24* (2013.01); *B29C 33/405* (2013.01); *B29C 39/02* (2013.01); *B29C 39/24* (2013.01);
(Continued)

(58) Field of Classification Search
CPC ...... C08G 59/24; C08G 59/38; C08G 59/687; C08G 59/226; C08G 59/245; G02B 1/04;
(Continued)

(56) References Cited

U.S. PATENT DOCUMENTS 8,591,785 B2 * 11/2013 Wagner ............... B29C 33/3842
264/219
2008/0193749 A1 * 8/2008 Thompson ............. G02B 1/041
428/343
(Continued)

FOREIGN PATENT DOCUMENTS

EP    2 891 673 A1    7/2015
EP    3 305 825 A1    4/2018
(Continued)

OTHER PUBLICATIONS

International Search Report for PCT/JP2016/072816 (PCT/ISA/210) dated Oct. 25, 2016.
(Continued)

Primary Examiner — Mathieu D Vargot
(74) Attorney, Agent, or Firm — Birch, Stewart, Kolasch & Birch, LLP (57) ABSTRACT

Provided is a curable composition which has chargeability into silicone molds and curability at excellent levels, less causes the silicone molds to swell, and allows the silicone molds to have better durability and a longer service life in repeated use. The curable composition according to the present invention contains curable compounds and a cationic initiator and is used for production of an optical component
(Continued)

by molding using silicone molds. The curable compounds include (A) a cycloaliphatic epoxy compound in a content of 10 weight percent or more of the totality of all the curable compounds contained in the curable composition. Of the totality of all the curable compounds contained in the curable composition, 10 to 50 weight percent is a curable compound or compounds having a molecular weight of 400 or more.

18 Claims, 2 Drawing Sheets

(51) Int. Cl.
| | |
|---|---|
| *B29D 11/00* | (2006.01) |
| *G02B 1/04* | (2006.01) |
| *B29C 39/24* | (2006.01) |
| *B29C 33/40* | (2006.01) |
| *C08G 59/38* | (2006.01) |
| *C08G 59/68* | (2006.01) |
| *C08G 65/18* | (2006.01) |
| *C08G 59/22* | (2006.01) |
| *B29C 39/26* | (2006.01) |
| *B29C 39/36* | (2006.01) |
| *B29C 39/38* | (2006.01) |
| *B29C 35/08* | (2006.01) |
| *B29C 33/00* | (2006.01) |
| *B29K 63/00* | (2006.01) |
| *B29K 105/24* | (2006.01) |
| *B29L 11/00* | (2006.01) |
| *G02B 3/08* | (2006.01) |

(52) U.S. Cl.
CPC .............. *B29C 39/26* (2013.01); *B29C 39/36* (2013.01); *B29C 39/38* (2013.01); *C08G 59/226* (2013.01); *C08G 59/245* (2013.01); *C08G 59/38* (2013.01); *C08G 59/687* (2013.01); *C08G 65/18* (2013.01); *G02B 1/04* (2013.01); *G02B 1/041* (2013.01); *B29C 35/0888* (2013.01); *B29C 2033/0005* (2013.01); *B29C 2035/0827* (2013.01); *B29C 2793/009* (2013.01); *B29C 2793/0027* (2013.01); *B29D 11/00269* (2013.01); *B29D 11/00298* (2013.01); *B29K 2063/00* (2013.01); *B29K 2105/24* (2013.01); *B29K 2883/00* (2013.01); *B29L 2011/005* (2013.01); *G02B 3/08* (2013.01)

(58) Field of Classification Search
CPC ......... G02B 1/041; B29C 39/02; B29C 39/24; B29C 45/0001; B29D 11/00269; B29D 11/00298
See application file for complete search history.

(56) References Cited

U.S. PATENT DOCUMENTS

| | | | |
|---|---|---|---|
| 2010/0314785 A1* | 12/2010 | Usami | G03F 7/0002 264/2.5 |
| 2011/0254187 A1* | 10/2011 | Mizoguchi | B29C 37/006 264/69 |
| 2015/0184044 A1* | 7/2015 | Ohashi | C08K 11/00 524/360 |
| 2015/0212300 A1 | 7/2015 | Kubo et al. | |
| 2015/0298365 A1 | 10/2015 | Yukawa et al. | |
| 2016/0083505 A1 | 3/2016 | Tanaka | |
| 2016/0311968 A1 | 10/2016 | Fujikawa et al. | |
| 2016/0334701 A1 | 11/2016 | Fujikawa et al. | |
| 2018/0094098 A1* | 4/2018 | Fujikawa | C08G 59/3281 |
| 2018/0134838 A1 | 5/2018 | Fujikawa et al. | |
| 2018/0230260 A1 | 8/2018 | Fujikawa et al. | |
| 2018/0284396 A1 | 10/2018 | Kubo et al. | |

FOREIGN PATENT DOCUMENTS

| | | |
|---|---|---|
| EP | 3 333 210 A1 | 6/2018 |
| JP | 3671658 B2 | 7/2005 |
| JP | 2014-224205 A | 12/2014 |
| JP | 2016-115779 A | 6/2016 |
| WO | WO 2014/084030 A1 | 6/2014 |
| WO | WO 2014/112295 A1 | 7/2014 |
| WO | WO 2015/098736 A1 | 7/2015 |
| WO | WO 2015/115128 A1 | 8/2015 |

OTHER PUBLICATIONS

Written Opinion of the International Searching Authority for PCT/JP2016/072816 (PCT/ISA/237) dated Oct. 25, 2016.
Extended European Search Report dated Feb. 19, 2019, in European Patent Application No. 16835048.6.

* cited by examiner

CURABLE COMPOSITION AND CURED PRODUCT FROM SAME

TECHNICAL FIELD

The present invention relates to curable compositions for use in production of optical components by molding using silicone molds. This application claims priority to Japanese Patent Application No. 2015-159893, filed to Japan on Aug. 13, 2015, the entire contents of which are incorporated herein by reference.

BACKGROUND ART

Molded articles having complicated and special shapes have been demanded for constituting lenses and other optical components so as to provide higher functions and higher performance of the optical components. Cast molding using curable compositions receives attention, because this technique can give a molded article having a complicated and special shape that is unachievable by already existing techniques such as injection molding. In particular, molding of curable compositions using molds advantageously enables accurate shape transfer, and contributes to significant cost reduction by using the molds repeatedly.

As the molds, silicone molds are widely used, because such silicone molds have shape transferability and mold releasability at excellent levels, and, in addition, they are transparent and are usable even for photocurable compositions.

A known example of the curable compositions is a photocurable composition including, for example, an epoxy resin (PTL 1). Disadvantageously, however, this curable composition is liable to permeate through silicone molds, thereby causes the silicone molds to swell gradually with an increasing number of uses, and fails to give highly accurate cured products. In addition, this impedes repeated use of the silicone molds and causes increase in cost.

CITATION LIST

Patent Literature

PTL 1: Japanese Patent No. 3671658

SUMMARY OF INVENTION

Technical Problem

The inventors of the present invention found that a curable composition containing a curable compound having a molecular weight of 400 or more less permeates through silicone molds, and less causes the silicone molds to swell, where the swelling will be caused by the permeation of the curable composition; and that the curable composition allows the molds to have better durability and a longer service life in repeated use. The inventors, however, also found that the curable composition, if containing an excessively large amount of such curable composition having a molecular weight of 400 or more, has an excessively high viscosity and is hardly charged into silicone molds rapidly, namely, has lower chargeability (filling properties) into silicone molds.

Accordingly, the present invention has an object to provide a curable composition which has chargeability into silicone molds and curability at excellent levels, less causes the silicone molds to swell, and thereby allows the silicone molds to have better durability and a longer service life in repeated use.

The present invention has another object to provide a curable composition which has chargeability into silicone molds and curability at excellent levels, can form a cured product having excellent heat resistance, less causes the silicone molds to swell, and thereby allows the silicone molds to have better durability and a longer service life in repeated use.

The present invention has yet another object to provide a curable composition which has chargeability into silicone molds and curability at excellent levels, can form a cured product having heat resistance and transparency at excellent levels, less causes the silicone molds to swell, and thereby allows the silicone molds to have better durability and a longer service life in repeated use.

The present invention has still another object to provide: a cured product of the curable composition, an optical component made of the cured product, and an optical device equipped with the optical component.

Solution to Problem

After intensive investigations to achieve the objects, the inventors have found a curable composition containing a cycloaliphatic epoxy compound, in which 10 to 50 weight percent of the totality of all curable compounds contained in the curable composition is a curable compound having a molecular weight of 400 or more, where the curable compound has high polarity and has such a property as to less permeate through silicone molds for use in molding of the curable composition. The inventors have also found that this curable composition has chargeability into silicone molds and curability at excellent levels, and less causes the silicone molds to swell, where the swelling will be caused by permeation of the curable composition; and that the curable composition thereby allows the silicone molds to have better durability and a longer service life in repeated use, namely, the curable composition has both chargeability into silicone molds and a restraining effect on swelling of silicone molds. The present invention has been made on the basis of these findings.

Specifically, the present invention provides, in one aspect, a curable composition for production of an optical component by molding using silicone molds, where the curable composition contains curable compounds and a cationic initiator. The curable compounds include (A) a cycloaliphatic epoxy compound in a content of 10 weight percent or more of the totality of all the curable compounds contained in the curable composition. Of the totality of all the curable compounds contained in the curable composition, 10 to 50 weight percent is a curable compound or compounds having a molecular weight of 400 or more.

In the curable composition, the cycloaliphatic epoxy compound (A) may be a compound represented by Formula (a):

[Chem. 1]

(a)

wherein $R^1$ to $R^{18}$ are each, identically or differently, selected from hydrogen, halogen, a hydrocarbon group optionally containing oxygen or halogen, and optionally substituted alkoxy; and X is selected from a single bond and a linkage group.

In the curable composition, the curable compounds may further include (B) an oxetane compound and (C) a glycidyl ether epoxy compound. The cycloaliphatic epoxy compound (A), the oxetane compound (B), and the glycidyl ether epoxy compound (C) may be present in combination in a total content of 70 weight percent or more of the totality of all the curable compounds contained in the curable composition.

In the curable composition, the oxetane compound (B) may be present in a content of 10 to 60 weight percent of the totality of all the curable compounds contained in the curable composition, and the glycidyl ether epoxy compound (C) may be present in a content of 20 to 80 weight percent of the totality of all the curable compounds contained in the curable composition.

The present invention also provides, in another aspect, a curable composition for production of an optical component by molding using silicone molds, where the curable composition contains curable compounds and a cationic initiator. The curable compounds include (A) a cycloaliphatic epoxy compound, (B) an oxetane compound, and (C) a glycidyl ether epoxy compound. The cycloaliphatic epoxy compound (A) is present in a content of 10 to 50 weight percent of the totality of all the curable compounds contained in the curable composition. The oxetane compound (B) is present in a content of 10 to 60 weight percent of the totality of all the curable compounds contained in the curable composition. The glycidyl ether epoxy compound (C) is present in a content of 20 to 80 weight percent of the totality of all the curable compounds contained in the curable composition. Of the totality of all the curable compounds contained in the curable composition, 10 to 50 weight percent is a curable compound or compounds having a molecular weight of 600 to 900. The curable composition has a content of a curable compound having a molecular weight of less than 200 of 30 weight percent or less of the totality of all the curable compounds contained in the curable composition. The curable composition has a content of a curable compound having a molecular weight of greater than 1000 of 30 weight percent or less of the totality of all the curable compounds contained in the curable composition.

In the curable composition, the optical component may be selected from a light diffusing lens, an imaging lens, and a sensor lens.

The present invention also provides, in yet another aspect, a cured product resulting from curing the curable composition.

The present invention also provides, in still another aspect, an optical component including (made of) the cured product.

The optical component may be to be subjected to reflow mounting.

The present invention also provides, in another aspect, an optical device including (equipped with) the optical component.

The present invention provides, in another aspect, a method for producing an optical component, where the method includes the steps 1, 2, 3, and 4 as follows:

In the step 1, molds including an upper mold and a lower mold are prepared, and the curable composition is charged into the lower mold.

In the step 2, the upper mold is assembled with the lower mold charged with the curable composition.

In the step 3, at least one of light and heat is applied to the curable composition and whereby the curable composition is cured to give a cured product.

In the step 4, the cured product is demolded.

In the optical component production method, the demolding of the cured product in the step 4 may be performed by initially removing one of the upper mold and the lower mold from the cured product, thereafter securing the cured product to a support, and then removing the other mold from the cured product.

In the optical component production method, the support may be an adhesive film.

In the optical component production method, the step 1 may further include, after charging the curable composition into the lower mold, degassing the charged curable composition.

In the optical component production method, the step 4 may further include dicing the demolded cured product.

In the optical component production method, the molds may be silicone molds.

In the optical component production method, the molds may be molds including an upper mold and a lower mold each having asperities in a surface to be in contact with the curable composition.

In the optical component production method, the upper mold and the lower mold are secured individually to transparent supports.

Specifically, the present invention relates to the following:

(1) A curable composition for production of an optical component by molding using silicone molds, the curable composition containing curable compounds and a cationic initiator, the curable compounds including (A) a cycloaliphatic epoxy compound in a content of 10 weight percent or more of the totality of all the curable compounds contained in the curable composition, 10 to 50 weight percent of the totality of all the curable compounds contained in the curable composition being a curable compound or compounds having a molecular weight of 400 or more.

(2) The curable composition according to (1), wherein the cycloaliphatic epoxy compound (A) is a compound represented by Formula (a).

(3) The curable composition according to (1), wherein the cycloaliphatic epoxy compound (A) is at least one compound selected from the group consisting of 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane.

(4) The curable composition according to any one of (1) to (3), wherein the cycloaliphatic epoxy compound (A) (when the curable composition contains two or more different compounds as the cycloaliphatic epoxy compounds (A), 90 weight percent or more of the compounds) has a solubility parameter of 9.0 to 15 $(cal/cm^3)^{1/2}$.

(5) The curable composition according to any one of (1) to (4), wherein the cycloaliphatic epoxy compound (A) (when the curable composition contains two or more different compounds as the cycloaliphatic epoxy compounds (A), 90 weight percent or more of the compounds) has a molecular weight of 150 to 800.

(6) The curable composition according to any one of (1) to (5), wherein the curable compounds further include (B) an oxetane compound and (C) a glycidyl ether epoxy compound, and wherein the cycloaliphatic epoxy compound (A), the oxetane compound (B), and the glycidyl ether epoxy compound (C) are present in combination in a total content of 70 weight percent or more of the totality of all the curable compounds contained in the curable composition.

(7) The curable composition according to (6), wherein the oxetane compound (B) is at least one compound selected from compounds represented by Formulae (b-1) to (b-5).

(8) The curable composition according to one of (6) and (7), wherein the oxetane compound (B) (when the curable composition contains two or more different compounds as the oxetane compounds (B), 90 weight percent or more of the compounds) has a solubility parameter of 9.0 to 15 $(cal/cm^3)^{1/2}$.

(9) The curable composition according to any one of (6) to (8), wherein the oxetane compound (B) (when the curable composition contains two or more different compounds as the oxetane compounds (B), 90 weight percent or more of the compounds) has a molecular weight of 100 to 800.

(10) The curable composition according to any one of (6) to (9), wherein the glycidyl ether epoxy compound (C) (when the curable composition contains two or more different compounds as the glycidyl ether epoxy compounds (C), 90 weight percent or more of the compounds) has a solubility parameter of 9.0 to 15 $(cal/cm^3)^{1/2}$.

(11) The curable composition according to any one of (6) to (10), wherein the glycidyl ether epoxy compound (C) (when the curable composition contains two or more different compounds as the glycidyl ether epoxy compounds (C), 90 weight percent or more of the compounds) has a molecular weight of 250 to 1500.

(12) The curable composition according to any one of (6) to (11), wherein the oxetane compound (B) is present in a content of 10 to 60 weight percent of the totality of all the curable compounds contained in the curable composition, and wherein the glycidyl ether epoxy compound (C) is present in a content of 20 to 80 weight percent of the totality of all the curable compounds contained in the curable composition.

(13) The curable composition according to any one of (1) to (12), wherein the cationic initiator is present in a proportion of 0.1 to 10.0 parts by weight per 100 parts by weight of the curable compounds contained in the curable composition.

(14) The curable composition according to any one of (1) to (13), wherein the curable composition further contains a compound selected from silicone surfactants, acrylic surfactants, and fluorochemical surfactants in a proportion of 0.01 to 3 parts by weight per 100 parts by weight of the curable compounds contained in the curable composition.

(15) The curable composition according to any one of (1) to (14), wherein the curable composition has a content of a curable compound having a molecular weight of less than 200 of 30 weight percent or less of the totality of all the curable compounds contained in the curable composition.

(16) The curable composition according to any one of (1) to (15), wherein the curable composition has a content of a curable compound having a molecular weight of greater than 1000 present of 30 weight percent or less of the totality of all the curable compounds contained in the curable composition.

(17) The curable composition according to any one of (1) to (16), wherein the curable composition has an average molecular weight of all the curable compounds contained in the curable composition of 260 to 600, where the average molecular weight is calculated according to the expression:

Average molecular weight=$(m^1 \times w^1 + m^2 \times w^2 + \ldots + m^n \times w^n)/100$ wherein the curable composition contains "n" different curable compounds, and wherein the curable compounds have molecular weights of $m^1, m^2, \ldots, m^n$ and are contained in proportions respectively of $w^1$ weight percent, $w^2$ weight percent, ..., $w^n$ weight percent, where $w^1+w^2+\ldots+w^n=100$.

(18) The curable composition according to any one of (1) to (17), wherein the curable composition has a content of a compound having a solubility parameter of less than 9.0 of 10 weight percent or less of the totality of all the curable compounds contained in the curable composition.

(19) The curable composition according to any one of (1) to (18), which has a viscosity of 100 to 1000 mPa·s at 25° C. and a shear rate of 20 $s^{-1}$.

(20) The curable composition according to any one of (1) to (19), wherein the optical component is selected from a light diffusing lens, an imaging lens, and a sensor lens.

(21) A cured product of the curable composition according to any one of (1) to (20).

(22) An optical component including the cured product according to (21).

(23) The optical component according to (22), which is to be subjected to reflow mounting.

(24) An optical device including the optical component according to one of (22) and (23).

(25) A method for producing an optical component, the method including the steps of:
1) preparing molds comprising an upper mold and a lower mold, and charging the curable composition according to any one of (1) to (20) into the lower mold;
2) assembling the upper mold with the lower mold charged with the curable composition;
3) applying at least one of light and heat and whereby curing the curable composition to give a cured product; and
4) demolding the cured product.

(26) The method according to (25) for producing an optical component, wherein the step 4 of demolding the cured product includes the substeps in the sequence set forth: a) removing one of the upper mold and the lower mold from the cured product; b) securing the cured product to a support; and c) removing the other mold from the cured product.

(27) The method according to (26) for producing an optical component, wherein the support is an adhesive film.

(28) The method according to any one of (25) to (27) for producing an optical component, wherein the step 1 further includes, after charging the curable composition according to any one of (1) to (20) into the lower mold, degassing the charged curable composition.

(29) The method according to any one of (25) to (28) for producing an optical component, wherein the step 4 further includes dicing the demolded cured product.

(30) The method according to any one of (25) to (29) for producing an optical component, wherein the molds are silicone molds.

(31) The method according to any one of (25) to (30) for producing an optical component, wherein the molds are molds including an upper mold and a lower mold each having asperities in a surface to be in contact with the curable composition.

(32) The method according to any one of (25) to (31) for producing an optical component, wherein the upper mold and the lower mold are secured individually to transparent supports.

Advantageous Effects of Invention

The curable compositions according to the present invention have the configurations, can thereby be rapidly charged into silicone molds in production of an optical component by molding using the silicone molds, and offer excellent workability. In addition, the curable compositions less cause the silicone molds to swell. Thus, the curable compositions allow the silicone molds to have a longer service life in repeated use, can give optical components having a highly accurate shape even in repeated use of the silicone molds, and offer excellent economic efficiency.

DESCRIPTION OF EMBODIMENTS

Cycloaliphatic Epoxy Compound (A)

The cycloaliphatic epoxy compound (A) for use in the present invention is hereinafter also referred to as a "component (A)". The cycloaliphatic epoxy compound (A) is represented typically by Formula (a):

[Chem. 2]

(a)

wherein $R^1$ to $R^{18}$ are each, identically or differently, selected from hydrogen, halogen, a hydrocarbon group optionally containing oxygen or halogen, and optionally substituted alkoxy; and X is selected from a single bond and a linkage group.

Non-limiting examples of the halogen as $R^1$ to $R^{18}$ include fluorine, chlorine, bromine, and iodine.

Non-limiting examples of the hydrocarbon group as $R^1$ to $R^{18}$ include aliphatic hydrocarbon groups, alicyclic hydrocarbon groups, aromatic hydrocarbon groups, and groups each including two or more of these groups bonded to each other.

Non-limiting examples of the aliphatic hydrocarbon groups include alkyls containing 1 to 20 carbon atoms (i.e., $C_1$-$C_{20}$ alkyls), such as methyl, ethyl, propyl, isopropyl, butyl, hexyl, octyl, isooctyl, decyl, and dodecyl, of which $C_1$-$C_{10}$ alkyls are preferred, and $C_1$-$C_4$ alkyls are particularly preferred; $C_2$-$C_{20}$ alkenyls such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which $C_2$-$C_{10}$ alkenyls are preferred, and $C_2$-$C_4$ alkenyls are particularly preferred; and $C_2$-$C_{20}$ alkynyls such as ethynyl and propynyl, of which $C_2$-$C_{10}$ alkynyls are prepared, and $C_2$-$C_4$ alkynyls are particularly preferred.

Non-limiting examples of the alicyclic hydrocarbon groups include $C_3$-$C_{12}$ cycloalkyls such as cyclopropyl, cyclobutyl, cyclopentyl, cyclohexyl, and cyclododecyl; $C_3$-$C_{12}$ cycloalkenyls such as cyclohexenyl; and $C_4$-$C_{15}$ bridged hydrocarbon groups such as bicycloheptyl and bicycloheptenyl.

Non-limiting examples of the aromatic hydrocarbon groups include $C_6$-$C_{14}$ aryls such as phenyl and naphthyl, of which $C_6$-$C_{10}$ aryls are preferred.

Non-limiting examples of the hydrocarbon group optionally containing oxygen or halogen, as $R^1$ to $R^{18}$, include groups resulting from replacing at least one hydrogen atom in the hydrocarbon groups with an oxygen-containing group or a halogen-containing group. Non-limiting examples of the oxygen-containing group include hydroxy; hydroperoxy; $C_1$-$C_{10}$ alkoxys such as methoxy, ethoxy, propoxy, isopropyloxy, butoxy, and isobutyloxy; $C_2$-$C_{10}$ alkenyloxys such as allyloxy; tolyloxy, naphthyloxy, and other $C_6$-$C_{14}$ aryloxys optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxys such as benzyloxy and phenethyloxy; $C_1$-$C_{10}$ acyloxys such as acetyloxy, propionyloxy, (meth)acryloyloxy, and benzoyloxy; $C_1$-$C_{10}$ alkoxycarbonyls such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxy-carbonyls optionally substituted with one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxy-carbonyls such as benzyloxycarbonyl; epoxy-containing groups such as glycidyloxy; oxetanyl-containing groups such as ethyloxetanyloxy; $C_1$-$C_{10}$ acyls such as acetyl, propionyl, and benzoyl; isocyanato; sulfo; carbamoyl; oxo; and groups each including two or more of these groups bonded to each other through a single bond or a linkage group such as $C_1$-$C_{10}$ alkylene. Non-limiting examples of the halogen-containing group include fluorine, chlorine, bromine, and iodine.

Non-limiting examples of the alkoxy as $R^1$ to $R^{18}$ include $C_1$-$C_{10}$ alkoxys such as methoxy, ethoxy, propoxy, isopropyloxy, butoxy, and isobutyloxy.

Examples of substituents which the alkoxy may have include halogen, hydroxy, $C_1$-$C_{10}$ alkoxys, $C_2$-$C_{10}$ alkenyloxys, $C_6$-$C_{14}$ aryloxys, $C_1$-$C_{10}$ acyloxys, mercapto, $C_1$-$C_{10}$ alkylthios, $C_2$-$C_{10}$ alkenylthios, $C_6$-$C_{14}$ arylthios, $C_7$-$C_{18}$ aralkylthios, carboxy, $C_1$-$C_{10}$ alkoxy-carbonyls, $C_6$-$C_{14}$ aryloxy-carbonyls, $C_7$-$C_{18}$ aralkyloxy-carbonyls, amino, mono- or di-$C_1$-$C_{10}$ alkylaminos, $C_1$-$C_{10}$ acylaminos, epoxy-containing groups, oxetanyl-containing groups, $C_1$-$C_{10}$ acyls, oxo, and groups each including two or more of these groups bonded to each other through a single bond or a linkage group such as $C_1$-$C_{10}$ alkylene.

In particular, $R^1$ to $R^{18}$ are preferably hydrogen atoms.

X in Formula (a) is selected from a single bond and a linkage group (divalent group containing one or more atoms). Non-limiting examples of the linkage group include divalent hydrocarbon groups, alkenylenes with part or all of carbon-carbon double bond(s) being epoxidized, carbonyl, ether bond, ester bond, amido, and groups each including two or more of these groups linked to each other.

Non-limiting examples of the divalent hydrocarbon groups include linear or branched $C_1$-$C_{18}$ alkylenes such as methylene, methylmethylene, dimethylmethylene, ethylene, propylene, and trimethylene, of which linear or branched $C_1$-$C_3$ alkylenes are preferred; and $C_3$-$C_{12}$ cycloalkylenes and $C_3$-$C_{12}$ cycloalkylidenes, such as 1,2-cyclopentylene, 1,3-cyclopentylene, cyclopentylidene, 1,2-cyclohexylene,

1,3-cyclohexylene, 1,4-cyclohexylene, and cyclohexylidene, of which $C_3$-$C_6$ cycloalkylenes and $C_3$-$C_6$ cycloalkylidenes are preferred.

The alkenylenes with part or all of carbon-carbon double bond(s) being epoxidized are hereinafter also referred to as "epoxidized alkenylenes". Non-limiting examples of alkenylenes from which the epoxidized alkenylenes are derived include $C_2$-$C_8$ linear or branched alkenylenes such as vinylene, propenylene, 1-butenylene, 2-butenylene, butadienylene, pentenylene, hexenylene, heptenylene, and octenylene. In particular, of the epoxidized alkenylenes, preferred are alkenylenes with all of carbon-carbon double bond(s) being epoxidized, and more preferred are $C_2$-$C_4$ alkenylenes with all of carbon-carbon double bond(s) being epoxidized.

Representative, but non-limiting examples of the compound represented by Formula (a) include 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane. The curable composition may contain each of them alone or in combination.

The compound represented by Formula (a) can be produced typically by reacting a compound represented by Formula (a') with a peroxy acid (such as peracetic acid) to epoxidize the double bond moieties in Formula (a'). In Formula (a'), $R^1$ to $R^{18}$ and X are as defined above.

[Chem. 3]

The solubility parameter (SP) of the component (A) and, when the curable composition contains two or more different compounds as the components (A), the solubility parameter of 90 weight percent or more (preferably 95 weight percent or more, and particularly preferably 99 weight percent or more) of the compounds are preferably 9.0 or more, typically 9.0 to 15, preferably 9.2 to 15, particularly preferably 9.5 to 15, and most preferably 9.6 to 14. The component (A), when having a solubility parameter within the range, less permeates through silicone molds. The curable composition, when containing the component (A) having a solubility parameter within the range, less causes the silicone molds to swell and thereby allows the silicone molds to have better durability and a longer service life in repeated use. The solubility parameters in the description are indicated in $(cal/cm^3)^{1/2}$.

The molecular weight of the component (A) and, when the curable composition according to the present invention contains two or more different compounds as the components (A), the molecular weight of 90 weight percent or more (preferably 95 weight percent or more, and particularly preferably 99 weight percent or more) of the compounds are typically 150 or more (for example, 150 to 800). The upper limit of the molecular weights is preferably 700, particularly preferably 500, and most preferably 300. The lower limit of the molecular weight is preferably 200, particularly preferably 230, and most preferably 250. A compound having a molecular weight less than the range is liable to permeate through silicone molds and tends to hardly less cause the silicone molds to swell. In contrast, a compound having a molecular weight greater than the range tends to be less chargeable into silicone molds.

The curable composition according to the present invention contains each of different components (A) alone or in combination as the curable compounds. The component (A) is present in a content of 10 weight percent or more of the totality (100 weight percent) of all the curable compounds contained in the curable composition; the upper limit of the content is typically 50 weight percent, more preferably 45 weight percent, particularly preferably 40 weight percent, and most preferably 35 weight percent; and the lower limit of the content is preferably 15 weight percent, and particularly preferably 20 weight percent. When the curable composition contains two or more different components (A), the term "content" is read as "total content" of them. The curable composition according to the present invention, as containing the component (A) in a content within the range, has excellent curability and gives a cured product that has transparency and heat resistance at excellent levels.

Oxetane Compound (B)

The curable composition according to the present invention preferably further contains one or more oxetane compounds (B) for offering better curability. Such an oxetane compound is hereinafter also referred to as a "component (B)". The oxetane compounds (B) are represented typically by Formula (b):

[Chem. 4]

wherein $R^a$ is selected from hydrogen and ethyl; $R^b$ represents a monovalent organic group; and t represents an integer of 0 or more.

The category "monovalent organic group" as $R^b$ includes monovalent hydrocarbon groups, monovalent heterocyclic groups, substituted oxycarbonyls (such as alkoxycarbonyls, aryloxycarbonyls, aralkyloxycarbonyls, and cycloalkyloxycarbonyls), substituted carbamoyls (such as N-alkylcarbamoyls and N-arylcarbamoyls), acyls (exemplified by aliphatic acyls such as acetyl; and aromatic acyls such as benzoyl), and monovalent groups each including two or more of these groups bonded to each other through a single bond or a linkage group.

Non-limiting examples of the monovalent hydrocarbon groups are as with $R^1$ to $R^{18}$ in Formula (a).

The monovalent hydrocarbon groups may each have one or more of various substituents. Non-limiting examples of the substituents include halogens, oxo, hydroxy, substituted oxys (such as alkoxys, aryloxys, aralkyloxys, and acyloxys), carboxy, substituted oxycarbonyls (such as alkoxycarbonyls, aryloxycarbonyls, and aralkyloxycarbonyls), substituted or unsubstituted carbamoyls, cyano, nitro, substituted or unsubstituted aminos, sulfo, and heterocyclic groups. The hydroxy and carboxy may each be protected with a protecting group generally used in the field of organic synthesis.

Heterocycles constituting the heterocyclic groups include aromatic heterocycles and non-aromatic heterocycles, and are exemplified by, but not limited to, oxygen-containing heterocycles, sulfur-containing heterocycles, and nitrogen-containing heterocycles, where oxygen, sulfur, and nitrogen are contained as heteroatoms. Non-limiting examples of the oxygen-containing heterocycles include 4-membered rings such as oxetane ring; 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocycles include 5-membered rings such as thiophene, thiazole, isothiazole, and thiadiazole rings; 6-membered rings such as 4-oxo-4H-thiopyran ring; and fused rings such as benzothiophene ring. Non-limiting examples of the nitrogen-containing heterocycles include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. Non-limiting examples of the monovalent heterocyclic groups include groups resulting from removing one hydrogen atom each from the structural formulae of the heterocycles.

The heterocyclic groups may each have one or more substituents. Non-limiting examples of the substituents include the substituents which the hydrocarbon groups may have; as well as alkyls (such as methyl, ethyl, and other $C_1$-$C_4$ alkyls), $C_3$-$C_{12}$ cycloalkyls, and $C_6$-$C_{14}$ aryls (such as phenyl and naphthyl).

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of these groups linked to each other.

The number t represents an integer of 0 or more and is typically 0 to 12, and preferably 1 to 6.

Non-limiting examples of the compounds represented by Formula (b) include compounds represented by Formulae (b-1) to (b-5):

[Chem. 5]

(b-1)

(b-2)

(b-3)

(b-4)

(b-5)

The solubility parameter of the component (B) and, when the curable composition according to the present invention contains two or more different compounds as the components (B), the solubility parameter of 90 weight percent or more (preferably 95 weight percent or more, and particularly preferably 99 weight percent or more) of the compounds are preferably 9.0 or more, typically 9.0 to 15, more preferably 9.5 to 15, particularly preferably 9.6 to 15, and most preferably 9.7 to 14. A component (B) having a solubility parameter within the range less permeates through silicone molds. The curable composition, when containing the component (B) having a solubility parameter within the range, less causes the silicone molds to swell and allows the silicone molds to have better durability and to offer a longer service life in repeated use.

The molecular weight of the component (B) and, when the curable composition according to the present invention contains two or more different compounds as the components (B), the molecular weight of 90 weight percent or more (preferably 95 weight percent or more, and particularly preferably 99 weight percent or more) of the compounds are typically 100 or more (for example, 100 to 800). The upper limit of the molecular weights is preferably 700, particularly preferably 500, especially preferably 300, and most preferably 200. A compound having a molecular weight less than the range is liable to permeate through silicone molds and tends to hardly less cause the silicone molds to swell. In contrast, a compound having a molecular weight greater than the range tends to cause the curable composition to be less chargeable into silicone molds.

The compounds represented by Formula (b) for use herein may be selected from commercial products available typically under the trade names of ARON OXETANE OXT-101, ARON OXETANE OXT-221, and ARON OXETANE OXT-610 (each from Toagosei Co., Ltd.); and the trade name of OXBP (from Ube Industries, Ltd.).

The curable composition according to the present invention may contain the component (B) in a content of typically 10 to 60 weight percent of the totality (100 weight percent)

of all the curable compounds contained in the curable composition. The upper limit of the content is preferably 50 weight percent, more preferably 40 weight percent, particularly preferably 35 weight percent, especially preferably 30 weight percent, and most preferably 25 weight percent; and the lower limit of the content is preferably 15 weight percent, and particularly preferably 20 weight percent. When the curable composition contains two or more different components (B), the term "content" is read as "total content" of them. The curable composition according to the present invention, when containing the component (B) in a content within the range, can cure with better curability.

Glycidyl Ether Epoxy Compound (C)

The curable composition according to the present invention preferably further contains one or more glycidyl ether epoxy compounds as the curable compounds, for having better curability and allowing the resulting cured product to have higher mechanical strengths. Such a glycidyl ether epoxy compound is hereinafter also referred to as a "component (C)".

The category "glycidyl ether epoxy compounds" includes aromatic glycidyl ether epoxy compounds, alicyclic glycidyl ether epoxy compounds, and aliphatic glycidyl ether epoxy compounds.

Non-limiting examples of the aromatic glycidyl ether epoxy compounds include epi-bis glycidyl ether epoxy resins resulting from subjecting an epihalohydrin and a bisphenol compound to condensation reaction, where the bisphenol compound is exemplified typically by bisphenol-A, bisphenol-F, bisphenol-S, and fluorene-bisphenol; high-molecular-weight epi-bis glycidyl ether epoxy resins resulting from subjecting these epi-bis glycidyl ether epoxy resins further to addition reaction with the bisphenol compound; novolac-alkyl glycidyl ether epoxy resins resulting from subjecting a phenolic compound and an aldehyde to condensation reaction to give a polyhydric alcohol, and subjecting the polyhydric alcohol further to condensation reaction with an epihalohydrin, where the phenolic compound is exemplified typically by phenol, cresol, xylenol, resorcinol, catechol, bisphenol-A, bisphenol-F, and bisphenol-S; and the aldehyde is exemplified typically by formaldehyde, acetaldehyde, benzaldehyde, hydroxybenzaldehyde, and salicylaldehyde; and epoxy compounds which contain a fluorene ring and two phenolic skeletons bonded at the 9-position of the fluorene ring, and which contain glycidyl groups individually bonded to oxygen atoms directly or through alkyleneoxy, where the oxygen atoms result from removing hydrogen atoms from the hydroxy groups of these phenolic skeletons.

Non-limiting examples of the alicyclic glycidyl ether epoxy compounds include hydrogenated bisphenol-A epoxy compounds, which are compounds resulting from hydrogenating bisphenol-A epoxy compounds, such as 2,2-bis[4-(2,3-epoxypropoxy) cyclohexyl]propane and 2,2-bis[3,5-dimethyl-4-(2,3-epoxypropoxy)cyclohexyl]propane; hydrogenated bisphenol-F epoxy compounds, which are compounds resulting from hydrogenating bisphenol-F epoxy compounds, such as bis[o,o-(2,3-epoxypropoxy)cyclohexyl]methane, bis[o,p-(2,3-epoxypropoxy)cyclohexyl] methane, bis[p,p-(2,3-epoxypropoxy) cyclohexyl]methane, and bis[3,5-dimethyl-4-(2,3-epoxypropoxy)cyclohexyl] methane; hydrogenated biphenol epoxy compounds; hydrogenated phenol-novolac epoxy compounds; hydrogenated cresol-novolac epoxy compounds; hydrogenated naphthalene epoxy compounds; and compounds resulting from hydrogenating epoxy compounds derived from trisphenolmethane.

Non-limiting examples of the aliphatic glycidyl ether epoxy compounds include glycidyl ethers of q-hydric alcohols devoid of cyclic structures, where q is a natural number; glycidyl esters of monovalent or multivalent carboxylic acids such as acetic acid, propionic acid, butyric acid, stearic acid, adipic acid, sebacic acid, maleic acid, and itaconic acid; epoxidized derivatives of double-bond-containing fats and oils, such as epoxidized linseed oils, epoxidized soybean oils, and epoxidized castor oils; epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycols, and polypropylene glycols; and trihydric or higher-hydric alcohols such as glycerol, diglycerol, erythritol, trimethylolethane, trimethylolpropane, pentaerythritol, dipentaerythritol, and sorbitol. The q-hydric alcohols may also be selected typically from polyether polyols, polyester polyols, polycarbonate polyols, and polyolefin polyols.

The solubility parameter of the component (C) and, when the curable composition according to the present invention contains two or more different compounds as the components (C), the solubility parameter of 90 weight percent or more (preferably 95 weight percent or more, and particularly preferably 99 weight percent or more) of the compounds are preferably 9.0 or more, typically 9.0 to 15, more preferably 9.0 to 14, particularly preferably 9.0 to 13, and most preferably 9.1 to 13. A component (C) having a solubility parameter within the range less permeates through silicone molds. The curable composition, when containing the component (C) having a solubility parameter within the range, less causes the silicone molds to swell and allows the silicone molds to have better durability and to offer a longer service life in repeated use.

The molecular weight of the component (C) and, when the curable composition according to the present invention contains two or more different compounds as the components (C), the molecular weight of 90 weight percent or more (preferably 95 weight percent or more, and particularly preferably 99 weight percent or more) of the compounds are typically 250 or more (for example, 250 to 1500). The lower limit of the molecular weights is preferably 300, and particularly preferably 350; and the upper limit of the molecular weights is preferably 1300, particularly preferably 1000, and most preferably 900. A compound having a molecular weight less than the range is liable to permeate through silicone molds and tends to hardly less cause the silicone molds to swell. In contrast, a compound having a molecular weight greater than the range tends to cause the curable composition to be less chargeable into silicone molds.

The curable composition according to the present invention may contain the component (C) in a content of typically 20 to 80 weight percent of the totality (100 weight percent) of all the curable compounds contained in the curable composition. The upper limit of the content is preferably 75 weight percent, particularly preferably 70 weight percent, and most preferably 65 weight percent; and the lower limit of the content is preferably 30 weight percent, particularly preferably 35 weight percent, especially preferably 40 weight percent, and most preferably 45 weight percent. When the curable composition contains two or more different compounds as the components (C), the term "content" is read as "total content" of them. The curable composition according to the present invention, when containing the component (C) in a content within the range, can have better curability and allows the resulting cured product to have higher mechanical strengths.

Other Curable Compounds

Where necessary, the curable composition according to the present invention may further contain a curable compound other than the components (A), (B), and (C), within a range not adversely affecting advantageous effects of the present invention. Such other curable compound is hereinafter also referred to as "other curable compound". Non-limiting examples of the other curable compound include epoxy compounds excluding the components (A) and the components (C); oxetane compounds excluding the components (B); vinyl ether compounds; acrylic compounds; and silicone compounds. Preferably, the total of contents (total content) of the components (A), (B), and (C) in the curable composition according to the present invention is typically 70 weight percent or more, preferably 80 weight percent or more, and more preferably 90 weight percent or more, of the totality (100 weight percent) of all the curable compounds contained in the curable composition. Accordingly, the content of the other curable compound is typically 30 weight percent or less, preferably 20 weight percent or less, and more preferably 10 weight percent or less, of the totality (100 weight percent) of all the curable compounds. The curable composition, if containing the other curable compound in a content greater than the range, tends to less satisfactorily offer advantageous effects of the present invention.

Cationic Initiator

The curable composition according to the present invention contains at least one cationic initiator (cationic-polymerization initiator). The category "cationic initiator" includes cationic photoinitiators and cationic thermal initiators.

The cationic photoinitiators are compounds that generate an acid upon application of light to initiate curing reactions of curable compounds contained in the curable composition. The cationic photoinitiators each include a cationic moiety that absorbs light, and an anionic moiety that serves as an acid source. The curable composition may contain each of different cationic photoinitiators alone or in combination.

Non-limiting examples of the cationic photoinitiators include diazonium salt compounds, iodonium salt compounds, sulfonium salt compounds, phosphonium salt compounds, selenium salt compounds, oxonium salt compounds, ammonium salt compounds, and bromine salt compounds.

In particular, the cationic photoinitiator for use in the present invention is preferably selected from sulfonium salt compounds so as to form a cured product with excellent curability. Non-limiting examples of the cationic moieties of the sulfonium salt compounds include arylsulfonium ions such as (4-hydroxyphenyl)methylbenzylsulfonium ion, triphenylsulfonium ion, diphenyl[4-(phenylthio)phenyl]sulfonium ion, 4-(4-biphenylylthio)phenyl-4-biphenylylphenylsulfonium ion, and tri-p-tolylsulfonium ion, of which triarylsulfonium ions are typified.

Non-limiting examples of the anionic moieties of the cationic photoinitiators include $[(Y)_s(Phf)_{4-s}]^-$ (where Y is selected from phenyl and biphenylyl; Phf represents a group resulting from replacing at least one of hydrogen atoms of a phenyl group with at least one selected from perfluoroalkyls, perfluoroalkoxys, and halogens; and s represents an integer of 0 to 3), $BF_4^-$, $[(Rf)_k PF_{6-k}]^-$ (where Rf represents a group resulting from replacing 80% or more of hydrogen atoms of an alkyl group with fluorine atoms; and k represents an integer of 0 to 5), $AsF_6^-$, $SbF_6^-$, and $SbF_5OH^-$.

Non-limiting examples of the cationic photoinitiators for use herein include (4-hydroxyphenyl)methylbenzylsulfonium tetrakis(pentafluorophenyl)borate, 4-(4-biphenylylthio)phenyl-4-biphenylylphenylsulfonium tetrakis(pentafluorophenyl)borate, 4-(phenylthio)phenyldiphenylsulfonium phenyltris(pentafluorophenyl)borate, [4-(4-biphenylylthio)phenyl]-4-biphenylylphenylsulfonium phenyltris(pentafluorophenyl)borate, diphenyl[4-(phenylthio)phenyl]sulfonium tris(pentafluoroethyl)trifluorophosphate, diphenyl[4-(phenylthio)phenyl]sulfonium tetrakis(pentafluorophenyl)borate, diphenyl[4-(phenylthio)phenyl]sulfonium hexafluorophosphate, 4-(4-biphenylylthio)phenyl-4-biphenylylphenylsulfonium tris(pentafluoroethyl)trifluorophosphate, bis[4-(diphenylsulfonio)phenyl]sulfide phenyltris(pentafluorophenyl)borate, [4-(2-thioxanthonylthio)phenyl]phenyl-2-thioxanthonylsulfonium phenyltris(pentafluorophenyl)borate, and 4-(phenylthio)phenyldiphenylsulfonium hexafluoroantimonate. Such cationic photoinitiators for use herein may also be selected from commercial products available typically under the trade names of: CYRACURE UVI-6970, CYRACURE UVI-6974, CYRACURE UVI-6990, and CYRACURE UVI-950 (each from Union Carbide Corporation, U.S.A.); Irgacure 250, Irgacure 261, and Irgacure 264 (each from BASF SE); CG-24-61 (from Ciba Geigy Ltd.); OPTOMER SP-150, OPTOMER SP-151, OPTOMER SP-170, and OPTOMER SP-171 (each from ADEKA CORPORATION); DAICAT II (from Daicel Corporation); UVAC 1590 and UVAC 1591 (each from DAICEL-CYTEC Company, Ltd.); CI-2064, CI-2639, CI-2624, CI-2481, CI-2734, CI-2855, CI-2823, CI-2758, and CIT-1682 (each from Nippon Soda Co., Ltd.); PI-2074 (from Rhodia, (tolylcumyl)iodonium tetrakis(pentafluorophenyl)borate); FFC 509 (from 3M Company); BBI-102, BBI-101, BBI-103, MPI-103, TPS-103, MDS-103, DTS-103, NAT-103, and NDS-103 (each from Midori Kagaku Co., Ltd.); CD-1010, CD-1011, and CD-1012 (each from Sartomer Company, Inc., U.S.A.); and CPI-100P and CPI-101A (each from San-Apro Ltd.).

The cationic thermal initiators are compounds that generate an acid upon application of heat (heat treatment) to initiate curing reactions of curable compounds contained in the curable composition. The cationic thermal initiators each include a cationic moiety that absorbs heat, and an anionic moiety that serves as an acid source. The curable composition may contain each of different cationic thermal initiators alone or in combination.

Non-limiting examples of the cationic thermal initiators include iodonium salt compounds and sulfonium salt compounds.

Non-limiting examples of the cationic moieties of the cationic thermal initiators include 4-hydroxyphenyl-methyl-benzylsulfonium ion, 4-hydroxyphenyl-methyl-(2-methylbenzyl)sulfonium ion, 4-hydroxyphenyl-methyl-1-naphthylmethylsulfonium ion, and p-methoxycarbonyloxyphenyl-benzyl-methylsulfonium ion.

Non-limiting examples of the anionic moieties of the cationic thermal initiators are as with the anionic moieties of the cationic photoinitiators.

Non-limiting examples of the cationic thermal initiators include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

The cationic initiator is present in a proportion of typically 0.1 to 10.0 parts by weight, preferably 0.1 to 5.0 parts by weight, particularly preferably 0.2 to 3.0 parts by weight, and most preferably 0.2 to 1.0 parts by weight, per 100 parts by weight of the totality of all the curable compounds contained in the curable composition. When the curable composition contains two or more different cationic initiators, the term "proportion" is read as "total proportion" of them. The curable composition, if containing the cationic initiator in a content less than the range, tends to have lower curability. In contrast, the curable composition, if containing the cationic initiator in a content greater than the range, tends to cause the cured product to be susceptible to coloring.

Other Components

In addition to the curable compounds and the cationic initiator, the curable composition according to the present invention may further contain one or more other components within a range not adversely affecting advantageous effects of the present invention. Non-limiting examples of the other components include antioxidants, ultraviolet absorbers, surface modifiers, fillers, photosensitizers, antifoaming agents, leveling agents, coupling agents, surfactants, flame retardants, decolorizing agents, adhesion imparting agents, and colorants.

Among them, the curable composition according to the present invention preferably contains a surface modifier, because this configuration allows the curable composition to have better wettability with silicone molds and thereby allows the curable composition to spread by wetting at a higher speed and to be charged at a higher speed upon charging of the curable composition into the silicone molds. Non-limiting examples of the surface modifier include silicone surfactants, acrylic surfactants, and fluorochemical surfactants. In particular, the surface modifier for use herein is preferably selected from silicone surfactants, because such silicone surfactants can especially effectively contribute to a higher charging speed.

Non-limiting examples of the silicone surfactants include polyether-modified polydimethylsiloxanes, polyester-modified polydimethylsiloxanes, acryl-containing polyether-modified polydimethylsiloxanes, and acryl-containing polyester-modified polydimethylsiloxanes. Such silicone surfactants for use in the present invention are advantageously selected from commercial products available typically under the trade names of BYK-333, BYK-345, BYK-UV 3510, BYK-UV 3500, BYK-UV 3530, and BYK-UV 3570 (each from BYK Japan KK).

The surface modifier may be present in a proportion of typically 0.01 to 3 parts by weight, preferably 0.03 to 2 parts by weight, and particularly preferably 0.1 to 1 part by weight, per 100 parts by weight of the totality of all the curable compounds contained in the curable composition. When the curable composition contains two or more different surface modifiers, the term "proportion" is read as "total proportion" of them.

Curable Composition

The curable composition according to the present invention contains a cationic initiator, and curable compounds including the component (A). The curable composition according to the present invention can be prepared by mixing these components with one another.

The curable composition according to the present invention contains a curable compound or compounds having a molecular weight of 400 or more (typically 400 to 1000, preferably 500 to 900, particularly preferably 600 to 900, and most preferably 700 to 900) in a content of 10 to 50 weight percent of the totality of all the curable compounds contained in the curable composition. The lower limit of the content is preferably 15 weight percent, and particularly preferably 20 weight percent. A curable compound having a molecular weight within the range less permeates through silicone molds. The curable composition, as containing the curable compound having a molecular weight within the range in a content within the range, less causes silicone molds to swell and allows the silicone molds to have better durability and a longer service life in repeated use.

In the curable composition according to the present invention, the content of a curable compound having a molecular weight of less than 200 is preferably typically 55 weight percent or less, more preferably 50 weight percent or less, furthermore preferably less than 50 weight percent, particularly preferably 45 weight percent or less, especially preferably 35 weight percent or less, and most preferably 30 weight percent or less, of the totality of all the curable compounds contained in the curable composition. The curable compound having a molecular weight of less than 200 is liable to permeate through silicone molds. The curable composition, if containing this curable compound in a content greater than the range, tends to hardly less cause the silicone molds to swell, and tends to cause the silicone molds to have lower durability.

In the curable composition according to the present invention, the content of a curable compound having a molecular weight of greater than 1000 is preferably typically 30 weight percent or less, particularly preferably 20 weight percent or less, especially preferably 10 weight percent or less, and most preferably 5 weight percent or less, of the totality of all the curable compounds contained in the curable composition. The curable composition, if containing the curable compound having a molecular weight of greater than 1000 in a content greater than the range, tends to have an excessively high viscosity, to be less chargeable into silicone molds, and to readily cause bubble entrainment.

The average molecular weight of all the curable compounds contained in the curable composition according to the present invention is typically 260 to 600. The upper limit of the average molecular weight is preferably 550, particularly preferably 530, especially preferably 500, and most preferably 450. The lower limit thereof is preferably 300, particularly preferably 330, especially preferably 350, and most preferably 380. The curable composition, when having an average molecular weight of the curable compounds less than the range, tends to hardly less cause silicone molds to swell, and tends to hardly allow the silicone molds to have better durability. In contrast, the curable composition, if having an average molecular weight of the curable compounds greater than the range, tends to have an excessively high viscosity, to be less chargeable into silicone molds, and to readily cause bubble entrainment.

The average molecular weight of all the curable compounds contained in the curable composition is a value determined by multiplying the molecular weights of individual curable compounds contained in the curable composition by the contents thereof in the curable composition, and summing up the results. For example, assume that curable composition contains "n" different curable compounds; and that the curable compounds have molecular weights respectively of $m^1, m^2, \ldots, m^n$ and are present in proportions respectively of $w^1$ weight percent, $w^2$ weight percent, ..., $w^n$ weight percent, where $w^1+w^2+\ldots+w^n=100$. In this case, the average molecular weight (average of the molecular weights) of all the curable compounds contained in the curable composition can be calculated according to the expression:

$$\text{Average molecular weight} = (m^1 \times w^1 + m^2 \times w^2 + \ldots + m^n \times w^n)/100$$

Of the totality of all the curable compounds contained in the curable composition according to the present invention, 90 weight percent or more (preferably 95 weight percent or more, and particularly preferably 99 weight percent or more) is preferably a compound or compounds having a solubility parameter of 9.0 or more.

Accordingly, of the totality of all the curable compounds contained in the curable composition according to the present invention, the content of a compound having a solubility parameter of less than 9.0 is preferably 10 weight percent or less, more preferably 5 weight percent or less, and particularly preferably 1 weight percent or less.

The curable composition according to the present invention contains a curable compound or compounds having a molecular weight within the range in a content within the range. More preferably, the curable composition contains a curable compound or compounds having a molecular weight within the range in a content within the range and contains a curable compound or compounds having a solubility parameter within the range in a content within the range. The curable composition therefore has chargeability into silicone molds and curability at excellent levels, less permeates through the silicone molds, and less causes the silicone molds to swell, where the swelling will be caused by permeation of the curable composition. Thus, the curable composition allows the silicone molds to maintain their shapes and to have better durability.

The curable composition according to the present invention has a viscosity of typically 100 to 1000 mPa·s, as determined at 25° C. and a shear rate of 20 s$^{-1}$. The upper limit of the viscosity is preferably 500 mPa·s, particularly preferably 400 mPa·s, and most preferably 350 mPa·s; and the lower limit of the viscosity is preferably 130 mPa·s, particularly preferably 150 mPa·s, and most preferably 170 mPa·s. The curable composition according to the present invention has a viscosity within the range, thereby has excellent chargeability into silicone molds, less causes bubbles to be entrained, and enables production of highly accurate optical components with excellent shape transferability. As used herein, the term "viscosity" refers to a value measured at a temperature of 25° C. and a shear rate of 20 s$^{-1}$ using a rheometer PHYSICA UDS200 (trade name, supplied by Anton Paar GmbH).

The curable composition according to the present invention less permeates through silicone molds and allows the silicone molds to have better durability. In addition, the curable composition has excellent chargeability into the silicone molds, less causes bubbles to be entrained, and can give highly accurate optical components with excellent shape transferability.

Cured Product

The cured product according to the present invention results from curing the curable composition. The curing is performed typically by applying at least one of light and heat to the curable composition.

The application of light (photoirradiation) is preferably performed using a light source, within such a range that the integral irradiance be typically 500 to 5000 mJ/cm$^2$. Non-limiting examples of the light source include mercury lamps, xenon lamps, carbon arc lamps, metal halide lamps, sunlight, electron beam sources, laser sources, and LEDs. Among them, the light source is preferably a UV-LED (with a wavelength of 350 to 450 nm).

The application of heat (heating; heat treatment) is preferably performed at a temperature of typically about 100° C. to about 200° C. (preferably 120° C. to 160° C.) for a short time (for example, about 1 to about 10 minutes, and preferably 1 to 3 minutes).

After the completion of application of at least one of light and heat, the resulting article is preferably further subjected to annealing to remove internal strain. The annealing is preferably performed by heating at a temperature of typically about 100° C. to about 200° C. for about 30 minutes to about 1 hour.

The cured product according to the present invention is highly transparent and has a transmittance of typically 80% or more, preferably 85% or more, and more preferably 90% or more, with respect to light with a wavelength of 400 nm.

The cured product according to the present invention is highly resistant to heat and can maintain its excellent transparency even after subjected to a heat test. For example, assume that the cured product is subjected to three successive heat tests as described in the working examples below. In this case, with respect to light with a wavelength of 400 nm, the resulting cured product has a transmittance of typically 90% or more, preferably 95% or more, and particularly preferably 98% or more, of the transmittance of the cured product before subjected to the heat tests. Specifically, the cured product has a rate of yellowing after subjected to the heat tests of typically 10% or less, preferably 5% or less, and more preferably 1% or less, where the rate of yellowing refers to the decreasing rate in transmittance with respect to light with a wavelength of 400 nm.

In addition, the cured product according to the present invention has excellent shape transferability. Specifically, the cured product, which results from subjecting the curable composition to molding using molds, has a shape to which the cavity shape (pattern) of the molds is accurately transferred, and the deviance (peak-to-valley value; PV) or error of the cured product shape from the cavity shape of the molds is typically 7.0 μm or less, preferably 5.0 μm or less, and particularly preferably 4.0 μm or less.

The cured product according to the present invention can maintain its excellent shape transferability even after subjected to a heat test, because of having excellent heat resistance. For example, after the cured product is subjected to three successive heat tests described in the working examples, the deviance (peak-to-valley value; PV) or error of the cured product shape from the cavity shape of the molds is typically 9.0 μm or less, preferably 7.0 μm or less, particularly preferably 5.0 μm or less, and most preferably 4.0 μm or less.

Optical Component

The optical component according to the present invention includes (is made of) the cured product. Non-limiting examples of the optical component according to the present invention include optical components for use typically in portable electronic devices (such as smartphones and tablet terminals), on-vehicle electronic devices, and various sensors (such as infrared sensors) and are exemplified typically by lenses such as flash lenses, light diffusing lenses, imaging lenses, and sensor lenses (lenses for sensors), of which Fresnel lenses are typified; and prisms.

The optical component according to the present invention may have dimensions as follows. The maximum width in a plan view (maximum width in a plan view when viewed from straight above) is typically about 1.0 to about 10 mm, preferably 1.0 to 8.0 mm, and particularly preferably 1.0 to 6.0 mm. The thickness in a thinnest portion is typically about 0.05 to about 0.5 mm, preferably 0.05 to 0.3 mm, and particularly preferably 0.1 to 0.3 mm. The thickness in a thickest portion is typically about 0.1 to about 3.0 mm, preferably 0.1 to 2.0 mm, and particularly preferably 0.2 to 2.0 mm.

The optical component according to the present invention has such heat resistance as to be sufficiently subjected to board-level mounting by a high-temperature heat treatment (such as reflow soldering and other high-temperature treatments at a temperature of 260° C. or higher). Accordingly, the optical component according to the present invention, when used to constitute an optical device, does not have to be mounted by an extra, separate step, but can be subjected to board-level mounting by a high-temperature heat treatment (such as reflow soldering) together with other components to give the optical device. This enables efficient and inexpensive production of the optical device. Specifically, the optical component according to the present invention is advantageously usable as an optical component to be subjected to reflow mounting. In addition, the optical component is also usable as an optical component in on-vehicle electronic devices, because of having excellent heat resistance.

The optical component according to the present invention has excellent optical properties and can therefore maintain the excellent optical properties even when subjected to board-level mounting by a high-temperature heat treatment (such as reflow soldering) collectively with other components.

Optical Component Production Method

The method according to the present invention for producing an optical component includes steps 1, 2, 3, and 4 as follows.

The step 1 is the step of preparing molds including an upper mold (cope) and a lower mold (drag), and charging the curable composition into the lower mold.

The step 2 is the step of assembling the upper mold with the lower mold charged with the curable composition.

The step 3 is the step of applying at least one of light and heat, and whereby curing the curable composition to give a cured product.

The step 4 is the step of demolding the cured product.

When molds for Fresnel lens molding are used as the molds in the step 1, the method gives a Fresnel lens as the cured product.

When molds having asperities in surfaces of the upper mold and the lower mold to be in contact with the curable composition are used, the method gives a cured product having surface asperities. For example, assume that the cured product is a Fresnel lens. Of such Fresnel lenses, advantageously, a Fresnel lens having surface asperities can effectively convert light to uniform, high-quality light without deterioration in central illuminance and diffuse the converted light, even when a semiconductor light source with poor quality is used.

Non-limiting examples of a material to constitute the molds (cope and lower mold) include metals, glass, plastics, and silicones. Among them, the lower mold is preferably a silicone mold (such as a silicone mold made from a polydimethylsiloxane). This is because such silicone mold has transparency, is thereby usable in molding of photocurable compositions, and offers shape transferability and mold releasability at excellent levels. With the present invention, the curable composition is used, which less causes such silicone molds to swell and allows the silicone molds to be used repeatedly. This enables inexpensive production of optical components. The silicone molds can be prepared typically by pouring a silicone resin into a master die (template) having a desired optical component shape (pattern), and curing the silicone resin.

In the molds including an upper mold and a lower mold, the upper mold and the lower mold are preferably secured individually to transparent supports, because this configuration enables stable production of accurate optical components. Non-limiting examples of materials to constitute the transparent supports include polycarbonates, poly(methyl methacrylate)s (PMMAs), cycloolefin polymers (COPs), and glass.

The charging of the curable composition into the lower mold in the step 1 may be performed typically by a technique such as a technique using a dispenser, screen process printing, curtain coating, or spraying.

After charging of the curable composition, the step 1 preferably further includes degassing (debubbling) the charged curable composition. This configuration enables removable of bubbles even when bubble entrainment occurs during charging and can give an optical component having excellent optical properties. The degassing can be performed typically by subjecting the charged curable composition to decompression.

The application of at least one of light and heat in the step 3 may be performed by a procedure similar to that in the application of at least one of light and heat described in the description of the "cured product".

The method may further include annealing after the application of light. The annealing may also be performed by a procedure similar to that in the annealing described in the description of the "cured product". The annealing may be performed before or after demolding of the cured product. The cured product according to the present invention has heat resistance and shape retention at excellent levels as described above, and can therefore maintain its shape accurately even when subjected to annealing after demolding.

When molds having two or more patterns for optical component are used in the step 1 (simultaneous molding), the demolding in the step 4 gives a cured product including two or more optical components linked to each other. In this case, the cured product is preferably cut at linking portions after demolding, to give isolated single pieces. The cutting into isolated single pieces may be performed typically by dicing. The simultaneous molding enables volume production of optical components.

The demolding in the step 4 is preferably performed by initially removing one of the upper mold and the lower mold from the cured product to expose part of the cured product, securing the exposed portion of the cured product to a support (such as an adhesive film), and then removing the other mold from the cured product. Advantageously, this configuration enables demolding without significant damage even of, for example, a cured product having an extremely small thickness; and enables easy and rapid demolding even of a very small cured product.

Figure 1:
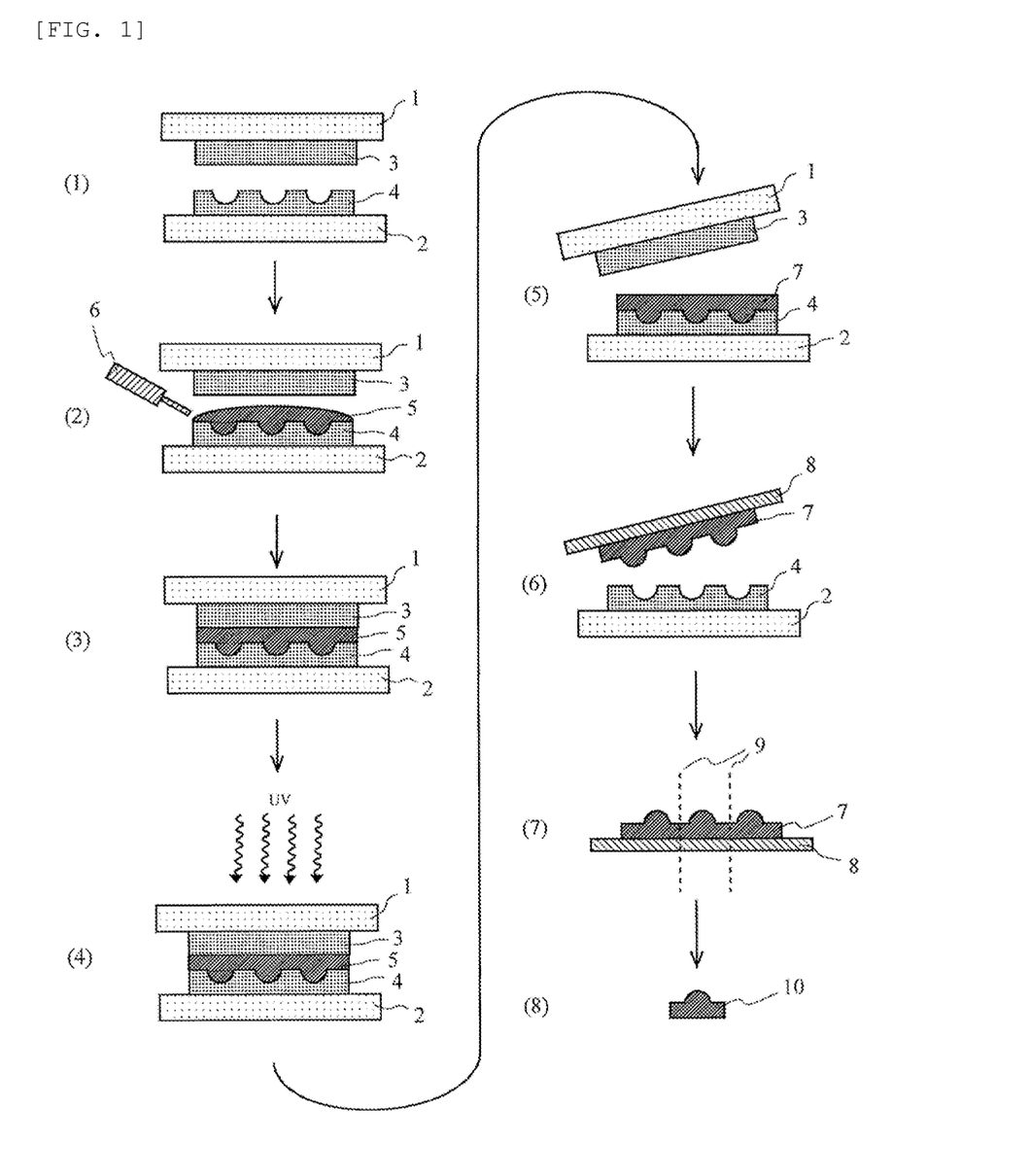
FIG. 1 illustrates a method according to an embodiment of the present invention for producing an optical component.

A method according to an embodiment of the present invention for producing an optical component is illustrated in FIG. 1. The steps (1) to (8) in FIG. 1 are as follows:

(1) securing the upper mold and the lower mold constituting the molds individually to transparent supports;

(2) charging the curable composition into the lower mold using a dispenser;

(3) assembling the upper mold with the lower mold;

(4) applying light to cure the curable composition to give a cured product;

(5) removing the upper mold from the cured product;

(6) securing the cured product to an adhesive film, and then removing the lower mold from the cured product;

(7) separating or isolating the cured product into isolated single pieces; and (8) picking up the isolated pieces of the cured product from the adhesive film.

The method according to the present invention for producing an optical component enables efficient production of highly accurate optical components.

Optical Device

The optical device according to the present invention is a device including (equipped with) the optical component. Non-limiting examples of the optical device include cellular phones, smartphones, tablet personal computers, and any other portable electronic devices; as well as infrared sensors, near-infrared sensors, millimeter-wave radars, LED spot-lighting devices, near-infrared LED lighting systems, mirror monitors, meter panels, head-mounted display (projection type) combiners, head-up display combiners, and any other on-vehicle electronic devices.

The optical device according to the present invention has excellent optical properties, because of including the optical component.

EXAMPLES

The present invention will be illustrated in further detail with reference to several examples below. It should be noted, however, that the examples are by no means intended to limit the scope of the present invention.

Preparation Example 1

Synthesis of (3,4,3',4'-diepoxy)bicyclohexyl (a-1)

A dehydration catalyst was prepared by mixing and stirring 70 g (0.68 mol) of 95 weight percent sulfuric acid and 55 g (0.36 mol) of 1,8-diazabicyclo[5.4.0]undecene-7 (DBU) with each other.

A 3-L flask was charged with 1000 g (5.05 mol) of hydrogenated biphenol (4,4'-dihydroxybicyclohexyl), 125 g (0.68 mol in terms of sulfuric acid) of the above-prepared dehydration catalyst, and 1500 g of pseudocumene, and was heated, where the flask was equipped with a stirrer, a thermometer, and a distillation pipe being packed with a dehydrating agent and thermally insulated. Water production was observed from around the time point when the internal temperature exceeded 115° C. The heating (temperature rise) was further continued up to the boiling point of pseudocumene (to an internal temperature of 162° C. to 170° C.), and dehydration reaction was performed under normal atmospheric pressure. The by-produced water was distilled and discharged through the dehydration tube out of the system. The dehydration catalyst was liquid and was finely dispersed in the reaction mixture under the reaction conditions. Approximately the stoichiometric amount (180 g) of water was distilled after a lapse of 3 hours, and this was defined as reaction completion. The reaction mixture after the reaction completion was subjected to distillation using an Oldershaw distilling column including 10 plates to distill off pseudocumene, was further subjected to distillation at an internal temperature of 137° C. to 140° C. and an internal pressure of 10 Torr (1.33 kPa), and yielded 731 g of bicyclohexyl-3,3'-diene.

Into a reactor, 243 g of the prepared bicyclohexyl-3,3'-diene and 730 g of ethyl acetate were charged. To the mixture, 274 g of a 30 weight percent solution (moisture content: 0.41 weight percent) of peracetic acid in ethyl acetate was added dropwise over about 3 hours while blowing nitrogen into the gas phase and controlling the temperature in the reaction system at 37.5° C.

After the completion of the dropwise addition, the resulting mixture was aged at 40° C. for one hour, and the reaction was completed. The crude mixture upon the reaction completion was washed with water at 30° C., from which low-boiling compounds were removed at 70° C. and 20 mmHg, and yielded 270 g of a reaction product. The reaction product had an oxirane oxygen content of 15.0 weight percent.

The reaction product was also subjected to $^1$H-NMR measurement to find that a peak at a δ of about 4.5 to about 5 ppm disappeared, where this peak is assigned to an internal double bond; but a peak at a δ of about 3.1 ppm appeared, where this peak is assigned to an epoxy-derived proton. Thus, the reaction product was identified as (3,4,3',4'-diepoxy)bicyclohexyl.

Preparation Example 2

Synthesis of bis(3,4-epoxycyclohexylmethyl) ether (a-2)

In a 5-L reactor, 499 g (12.48 mol) of (granular) sodium hydroxide and 727 mL of toluene were placed. After nitrogen purging, a solution of 420 g (3.74 mol) of tetrahydrobenzyl alcohol in 484 mL of toluene was added, followed by aging at 70° C. for 1.5 hours. Next, the mixture was combined with 419 g (2.20 mol) of tetrahydrobenzyl methanesulfonate, aged under reflux for 3 hours, cooled down to room temperature, combined with 1248 g of water to stop the reaction, and the reaction mixture was separated into an aqueous layer and an organic layer.

The separated organic layer was concentrated, subjected to distillation under reduced pressure, and yielded di-tetrahydrobenzyl ether as a colorless, transparent liquid (in a yield of 85%). The $^1$H-NMR spectrum of the prepared di-tetrahydrobenzyl ether was measured as follows:

$^1$H-NMR (CDCl$_3$): δ 1.23-1.33 (m, 2H), 1.68-1.94 (m, 6H), 2.02-2.15 (m, 6H), 3.26-3.34 (m, 4H), 5.63-7.70 (m, 4H)

In a reactor, 200 g (0.97 mol) of the above-prepared di-tetrahydrobenzyl ether, 0.39 g of 20% SP-D (acetic acid solution), and 669 mL of ethyl acetate were charged, followed by temperature rise up to 40° C. Next, 608 g of 29.1% peracetic acid were added dropwise over 5 hours, followed by aging for 3 hours. The organic layer was then washed sequentially with an alkaline aqueous solution three times and with ion-exchanged water two times, subjected to distillation under reduced pressure, and yielded bis(3,4-epoxycyclohexylmethyl) ether as a colorless, transparent liquid (in a yield of 77%).

Examples 1 to 5 and Comparative Examples 1 and 2

Components were mixed in accordance with the formulae (compositions; in part by weight) given in Table 1 and yielded curable compositions.

Average Molecular Weight Calculation Method

The average of molecular weights of all curable compounds contained in a sample curable composition was calculated according to the expression:

Average molecular weight=$(m^1 \times w^1 + m^2 \times w^2 + \ldots + m^n \times w^n)/100$ wherein the curable composition contains "n" different curable compounds; and wherein the curable compounds have molecular weights respectively of $m^1, m^2, \ldots, m^n$ and are present in proportions respectively of $w^1$ weight percent, $w^2$ weight percent, ..., $w^n$ weight percent, where $w^1+w^2+\ldots+w^n=100$.

Viscosity

The viscosity (mPa·s) of each of the prepared curable compositions was measured at a temperature of 25° C. and a shear rate of 20 s$^{-1}$ using a rheometer PHYSICA UDS200 (trade name, supplied by Anton Paar GmbH).

Swelling Rate of Silicone Mold

The swelling rate of a silicone mold was measured on the prepared curable compositions.

A silicone resin KE-1606 (trade name, supplied by Shin-Etsu Chemical Co., Ltd.) was mixed with a curing agent CAT-RG (trade name, supplied by Shin-Etsu Chemical Co., Ltd.), held at 60° C. for 24 hours and at 150° C. for 1 hour to be cured, and yielded a silicone mold (20 mm by 20 mm by 0.5 mm).

The prepared silicone mold was weighed to give a mold weight before immersion, then entirely immersed in each of the curable compositions prepared in the examples and the comparative examples, and left as intact at 25° C. for 3 hours.

Next, the silicone mold was retrieved, from which surface the curable composition was wiped away, and the resulting silicone mold was weighed to give a mold weight after immersion.

The swelling rate of the silicone mold was determined according to the expression:

Swelling rate (%) of silicone mold={[(Mold weight after immersion)−(Mold weight before immersion)]/(Mold weight before immersion)}×100

Chargeability (Wet Spreading Time)

A silicone resin KE-1606 (trade name, supplied by Shin-Etsu Chemical Co., Ltd.) was mixed with a curing agent CAT-RG (trade name, supplied by Shin-Etsu Chemical Co., Ltd.), held at 60° C. for 24 hours and at 150° C. for 1 hour to be cured, and yielded a silicone mold (diameter: 50 mm) having a flat surface.

Onto the flat surface of the prepared silicon mold, 3 g of each of the prepared curable compositions were dropped, and the time (in second) until wet spreading of the dropped curable composition stopped was measured to evaluate chargeability.

Appearance

An after-mentioned lower mold (silicone mold) was charged with each of the prepared curable compositions using a dispenser, and placed in a desiccator, followed by decompression using a vacuum pump. After performing the decompression for 5 minutes and after the absence of bubble entrainment was checked, pressure release was performed. Spacers were placed in the periphery of the lower mold to a thickness of 0.5 mm, and an after-mentioned upper mold (silicone mold) was pressed from above, and the molds were closed.

Next, the curable composition in the silicone molds was irradiated with light (at 100 mW/cm$^2$ for 30 seconds) using a UV-LED (365 nm) and yielded a round cured product. The upper mold (silicone mold) was removed, and the round cured product attached to the lower mold (silicone mold) was applied to, and secured to, an adhesive film No. 51825 (trade name, supplied by 3M Japan Ltd.), and then the lower mold (silicone mold) was removed.

The prepared round cured product was set in dicing equipment (supplied by DISCO Corporation), diced to pieces of 5.0 mm by 5.0 mm, and yielded cured products for evaluation.

The appearances of the cured products for evaluation were observed and evaluated according to the following criteria:

Good: none of abnormalities selected from bubble entrainment, soiling, cracking, and defective molding was observed; and Poor: one or more of abnormalities selected from bubble entrainment, soiling, cracking, and defective molding were observed.

Transferability (Shape Accuracy)

Each of the prepared curable composition was dispensed into the lower mold (silicone mold), spacers were placed to a thickness of 0.5 mm, the upper mold (silicone mold) was pressed from above, and the molds were closed.

Next, the curable composition in the molds was irradiated with light (at 100 mW/cm$^2$ for 30 seconds) using a UV-LED (365 nm) and yielded a cured product.

Deviation (μm) from the designed value was measured on the hemispherical portion at the center of the prepared cured product, using an Ultrahigh Accurate 3-D Profilometer UA-3P (trade name, supplied by Panasonic Corporation), to evaluate transferability.

The silicone molds used herein were prepared in the following manner.

Figure 2:
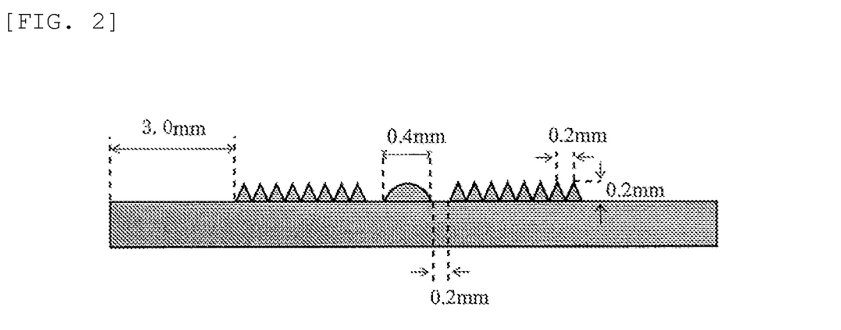
FIG. 2 is a schematic cross-sectional view of a master die used for the preparation of a lower mold (silicone mold) in working examples.

As a master die for the preparation of the lower mold (silicone mold), there was prepared a master die as illustrated in FIG. 2. This master die was made of a metal material and had a cylindrical shape with a diameter of 10.0 mm. On the surface of the metal material, a hemispherical portion having a radius of curvature of 0.2 mm and a diameter of 0.4 mm was provided at the center; a flat portion having a width of 0.2 mm was provided around the periphery of the hemispherical portion; and, around the flat portion, eight projections each having a height of 0.2 mm were provided at a pitch of 0.2 mm toward the periphery of the cylinder.

A silicone resin KE-1606 (trade name, supplied by Shin-Etsu Chemical Co., Ltd.) was mixed with a curing agent CAT-RG (trade name, supplied by Shin-Etsu Chemical Co., Ltd.), and the mixture was poured into a flask in which the master die was placed, held at 60° C. for 24 hours, and then at 150° C. for 1 hour to be cured, and yielded the lower mold (silicone mold). Next, a support (glass substrate having a size of 10 mm by 10 mm) was prepared, and coated with an adhesive Cemedine 8000 (trade name, supplied by Cemedine Co., Ltd.) to a thickness of 1.0 mm, on which the prepared lower mold (silicone mold) was laminated. The resulting article was heated at 80° C. for 2 hours to cure the adhesive and yielded the lower mold (silicone mold) secured to the support.

Figure 3:
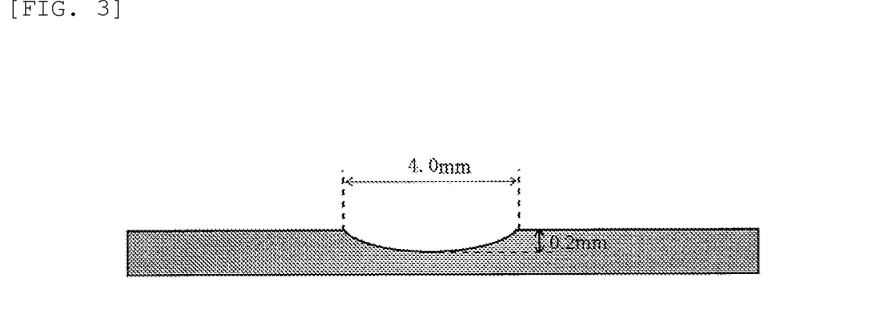
FIG. 3 is a schematic cross-sectional view of an exemplary master die for use in the preparation of an upper mold (silicone mold)
Figure 4:
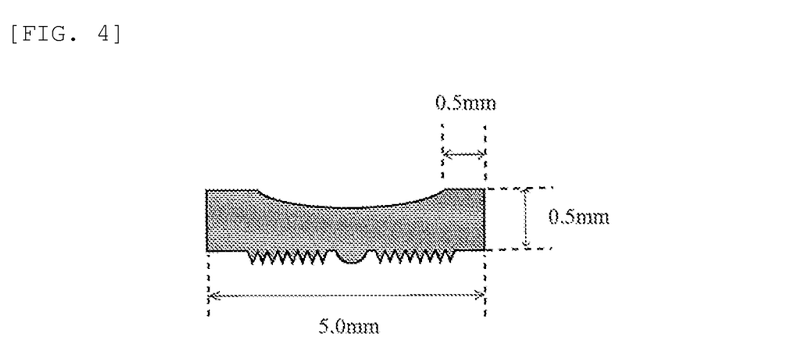
FIG. 4 is a schematic cross-sectional view of an optical component according to an embodiment of the present invention.

Regarding the upper mold (silicone mold), the upper mold (silicone mold) secured to a support was prepared by a procedure similar to that in the lower mold, except for using a master die having a flat surface.

Successive Transferability: Number of Transfers

Molding was performed repeatedly by a procedure similar to that in the evaluation of "Transferability (Shape Accuracy)", and the number of molding processes until a cured product became unable to be demolded from the molds was defined as the number of transfers.

Successive Transferability: Shape Accuracy

Molding was repeated by a procedure similar to that in "Successive Transferability: Number of Transfers" until a cured product become unable to be demolded from the molds. Of the cured products that could be demolded, a cured product that was obtained last was subjected to measurement of a deviation (μm) from the designed value by a procedure similar to that in "Transferability (Shape Accuracy)", to evaluate shape accuracy in successive transfers.

Heat Resistance (Shape Accuracy After Reflow)

A cured product prepared by a procedure similar to that in the evaluation of "Transferability (Shape Accuracy)" was subjected to three successive heat tests according to the reflow temperature profile (highest temperature: 270° C.) described in JEDEC standards, using a table-top reflow oven (supplied by SHINAPEX CO., LTD.). The resulting sample was subjected to measurement of a deviation (μm) from the designed value by a procedure similar to that in "Transferability (Shape Accuracy)", to evaluate heat resistance.

Thermal-Yellowing Resistance (Transparency Retention Rate After Reflow)

A cured product prepared by a procedure similar to that in the evaluation of "Transferability (Shape Accuracy)" was subjected to measurement of transmittance with respect to light with a wavelength of 400 nm using a spectrophotometer and then subjected to three successive heat tests according to the reflow temperature profile (highest temperature: 270° C.) described in JEDEC standards, using a table-top reflow oven (supplied by SHINAPEX CO., LTD.). The cured product after the completion of the tests was subjected to measurement of transmittance with respect to light with a wavelength of 400 nm, based on which a transparency retention rate was calculated according to the following expression, to evaluate the thermal-yellowing resistance.

Transparency retention rate (%)=[(Transmittance at 400 nm after reflow)/(Transmittance at 400 nm before reflow)]×100

The abbreviations in Table 1 stand for as follows:

Curable Compounds

CELLOXIDE 2021P: 3,4-epoxycyclohexylmethyl (3,4-epoxy)cyclohexanecarboxylate, having a solubility parameter of 10.26, trade name CELLOXIDE 2021P, supplied by Daicel Corporation (a-1): the compound prepared in Preparation Example 1, (3,4,3',4'-diepoxy)bicyclohexyl, having a solubility parameter of 9.69

(a-2): the compound prepared in Preparation Example 2, bis(3,4-epoxycyclohexylmethyl) ether, having a solubility parameter of 9.64

OXT101: 3-ethyl-3-hydroxymethyloxetane, having a solubility parameter of 11.6, trade name ARON OXETANE OXT-101, supplied by Toagosei Co., Ltd.

ZX-1658GS: 1,4-cyclohexanedimethanol diglycidyl ether, having a solubility parameter of 9.45, trade name ZX-1658GS, supplied by Nippon Steel Chemical Co., Ltd.

YX8000: hydrogenated bisphenol-A epoxy compound, having a solubility parameter of 9.19, trade name YX8000, supplied by Mitsubishi Chemical Corporation GT401: ε-caprolactone-modified tetra(3,4-epoxycyclohexylmethyl) butanetetracarboxylate, having a solubility parameter of 10.6, trade name EPOLEAD GT401, supplied by Daicel Corporation EP-4000S: bisphenol-A propylene oxide adduct diglycidyl ether, having a solubility parameter of 10.09, trade name ADEKA EP-4000S, supplied by ADEKA CORPORATION Cationic Initiators CPI-101A: diphenyl[4-(phenylthio)phenylsulfonium] hexafluoroantimonate, trade name CPI-101A, supplied by San-Apro Ltd.

(d-1): 4-(phenylthio)phenyldiphenylsulfonium phenyltris(pentafluorophenyl)borate Surface Modifiers BYK-333: polyether-modified polydimethylsiloxane, trade name BYK-333, supplied by BYK Japan KK BYK-UV 3510: polyether-modified polydimethylsiloxane, trade name BYK-UV 3510, supplied by BYK Japan KK

TABLE 1

| | | | Molecular weight | Example 1 | Example 2 | Example 3 | Example 4 | Example 5 | Comp. Ex. 1 | Comp. Ex. 2 |
|---|---|---|---|---|---|---|---|---|---|---|
| Composition | Curable compounds | CELLOXIDE 2021P | 252 | 20 | | | | | | |
| | | (a-1) | 194 | | 20 | 30 | 30 | | 15 | 20 |
| | | (a-2) | 238 | | | | | 30 | | |
| | | OXT101 | 116 | 20 | 20 | 20 | 20 | 20 | 15 | |
| | | ZX-1658GS | 228 | | | | | | | 50 |
| | | YX8000 | 353 | 30 | 30 | 30 | | 30 | | 30 |
| | | GT401 | 789 | | | | 20 | | | |
| | | EP-4000S | 857 | 30 | 30 | | 50 | 20 | 70 | |
| | | Average molecular weight | | 436.6 | 425 | 345.1 | 509.9 | 371.9 | 646.4 | 258.7 |
| | Cationic initiator | CPI-101A | | 0.5 | 0.5 | | 0.5 | | 0.5 | 0.5 |
| | | (d-1) | | | | 0.5 | | 0.5 | | |
| | Surface modifier | BYK-333 | | 0.5 | | 0.5 | 0.5 | | 0.5 | |
| | | BYK-UV 3510 | | | 0.5 | | | 0.5 | | 0.5 |
| Viscosity (mPa · s) | | | | 308 | 187 | 387 | 265 | 214 | 789 | 121 |
| Swelling rate of silicone mold (%) | | | | 2.1 | 2.4 | 2.9 | 2.7 | 2.2 | 1.8 | 5.5 |
| Chargeability (wet spreading time) (sec) | | | | 14 | 6 | 21 | 13 | 10 | 67 | 5 |
| Appearance | | | | Good | Good | Good | Good | Good | Poor | Good |
| Transferability (deviation in μm) | | | | 2 | 1 | 5 | 4 | 6 | 9 | 8 |
| Successive transferability | Number of transfers | | | 200 | 180 | 167 | 196 | 189 | 245 | 34 |
| | Shape accuracy (deviation in μm) | | | 3 | 1 | 6 | 4 | 6 | 10 | 13 |
| Heat resistance | Shape accuracy (deviation in μm) | | | 2 | 1 | 5 | 4 | 9 | 8 | 8 |
| | Transparency retention rate (%) | | | 99.1 | 99.3 | 98.5 | 98.6 | 99.0 | 98.2 | 99.0 |

INDUSTRIAL APPLICABILITY

The curable compositions according to the present invention, when used for production of an optical component by molding using silicone molds, can be charged rapidly into the silicone molds and offer excellent workability. In addition, the curable compositions less cause the silicone molds to swell, thereby allow the silicone molds to have a longer service life in repeated use, can give optical components having highly accurate shapes even in repeated use of the silicone molds, and offer excellent economic efficiency.

REFERENCE SIGNS LIST 1, 2 transparent support
3 upper mold (silicone mold)
4 lower mold (silicone mold)
5 curable composition
6 dispenser
7 cured product of curable composition
8 adhesive film
9 cutting site
10 isolated cured product (optical component)

The invention claimed is:

1. A curable composition for production of an optical component by molding using silicone molds, the curable composition comprising:
   curable compounds; and
   a cationic initiator,
   the curable compounds comprising
   (A) a cycloaliphatic epoxy compound;
   (B) an oxetane compound; and
   (C) a glycidyl ether epoxy compound,
   the cycloaliphatic epoxy compound (A) being a compound represented by Formula (a):

wherein $R^1$ to $R^{18}$ are each, identically or differently, selected from, hydrogen, halogen, a hydrocarbon group optionally containing oxygen or halogen, and optionally substituted alkoxy; and X is selected from a single bond and a linkage group,
   wherein the linkage group is selected from divalent hydrocarbon groups, alkenylenes with part or all of carbon-carbon double bond(s) being epoxidized, carbonyl, ether bond, ester bond, amido, and groups each including two or more of these groups linked to each other,
   wherein the cycloaliphatic epoxy compound (A) is present in a content of 10 weight percent or more of the totality of all the curable compounds contained in the curable composition,
   wherein the glycidyl ether epoxy compound (C) comprises an aromatic glycidyl ether epoxy compound, and an alicyclic glycidyl ether epoxy compound,
   wherein the cycloaliphatic epoxy compound (A), the oxetane compound (B), and the glycidyl ether epoxy compound (C) are present in combination in a total content of 90 weight percent or more of the totality of all the curable compounds contained in the curable composition, and
   wherein of the totality of all the curable compounds contained in the curable composition, 10 to 50 weight percent are a curable compound or compounds having a molecular weight of 400 or more.

2. The curable composition according to claim 1,
   wherein the oxetane compound (B) is present in a content of 10 to 60 weight percent of the totality of all the curable compounds contained in the curable composition, and
   wherein the glycidyl ether epoxy compound (C) is present in a content of 20 to 80 weight percent of the totality of all the curable compounds contained in the curable composition.

3. The curable composition according to claim 1,
   wherein
   the cycloaliphatic epoxy compound (A) is present in a content of 10 to 50 weight percent of the totality of all the curable compounds contained in the curable composition,
   the oxetane compound (B) is present in a content of 10 to 60 weight percent of the totality of all the curable compounds contained in the curable composition,
   the glycidyl ether epoxy compound (C) is present in a content of 20 to 80 weight percent of the totality of all the curable compounds contained in the curable composition,
   of the totality of all the curable compounds contained in the curable composition, 10 to 50 weight percent is a curable compound or compounds having a molecular weight of 600 to 900,
   a content of a curable compound having a molecular weight of less than 200 is 30 weight percent or less of the totality of all the curable compounds contained in the curable composition, and
   a content of a curable compound having a molecular weight of greater than 1000 is 30 weight percent or less of the totality of all the curable compounds contained in the curable composition.

4. The curable composition according to claim 1,
   wherein the optical component is selected from a light diffusing lens, an imaging lens, and a sensor lens.

5. A cured product of the curable composition according to claim 1.

6. An optical component comprising
   the cured product according to claim 5.

7. An optical device comprising
   the optical component according to claim 6.

8. A method for producing an optical component, the method comprising the steps of:
   1) preparing molds comprising an upper mold and a lower mold, and charging the curable composition according to claim 1 into the lower mold;
   2) assembling the upper mold with the lower mold charged with the curable composition;
   3) applying at least one of light and heat and whereby curing the curable composition to give a cured product; and
   4) demolding the cured product.

9. The method according to claim 8 for producing an optical component,
   wherein the step 4 of demolding the cured product comprises the substeps in the sequence set forth:
   a) removing one of the upper mold and the lower mold from the cured product;

b) securing the cured product to a support; and
c) removing the other mold from the cured product.

10. The method according to claim 9 for producing an optical component,
wherein the support is an adhesive film.

11. The method according to any one of claims 8 to 10 for producing an optical component,
wherein the step 1 further comprises, after charging the curable composition into the lower mold, degassing the charged curable composition.

12. The method according to claim 8 for producing an optical component,
wherein the step 4 further comprises dicing the demolded cured product.

13. The method according to claim 8 for producing an optical component,
wherein the molds are silicone molds.

14. The method according to claim 8 for producing an optical component,
wherein the molds are molds comprising an upper mold and a lower mold each having asperities in a surface to be in contact with the curable composition.

15. The method according to claim 8 for producing an optical component,
wherein the upper mold and the lower mold are individually secured to transparent supports.

16. The curable composition according to claim 1,
wherein the oxetane compound (B) is 3-ethyl-3-hydroxymethyloxetane, and
wherein the oxetane compound (B) is present in a content of 10 to 60 weight percent of the totality of all the curable compounds contained in the curable composition.

17. The curable composition according to claim 1,
wherein the cycloaliphatic epoxy compound (A) comprises one selected from 3,4-epoxycyclohexylmethyl (3,4-epoxy)cyclohexanecarboxylate and bis(3,4-epoxycyclohexylmethyl) ether.

18. The curable composition according to claim 1,
wherein the curable composition further comprises an ε-caprolactone-modified tetra(3,4-epoxycyclohexylmethyl) butanetetracarboxylate.

* * * * *